United States Patent [19]

Chavannes

[11] 4,129,788
[45] Dec. 12, 1978

[54] HIGH EFFICIENCY DC TO DC CONVERTER

[75] Inventor: Theodore E. Chavannes, Woodland Hills, Calif.

[73] Assignee: Dracon Industries, Chatsworth, Calif.

[21] Appl. No.: 790,976

[22] Filed: Apr. 26, 1977

[51] Int. Cl.² ............................................ H02P 13/26
[52] U.S. Cl. ........................................ 307/11; 307/60; 363/26
[58] Field of Search ................... 307/11, 87, 151, 60; 363/26, 24, 25

[56] References Cited

U.S. PATENT DOCUMENTS

| 3,551,777 | 12/1970 | Bingley | 363/26 |
| 3,701,937 | 10/1972 | Combs | 363/25 |

Primary Examiner—Robert K. Schaefer
Assistant Examiner—Morris Ginsburg
Attorney, Agent, or Firm—Flehr, Hohbach, Test, Albritton & Herbert

[57] ABSTRACT

A DC to DC converter has an unregulated input and provides a pair of regulated outputs which independently provide variable power on demand to two independent loads at a substantially constant output voltage. The converter includes three major sections, the input oscillator and pulse width modulation section, the isolated negative DC regulator and the isolated positive DC regulator. Each of the DC regulators is current limited and each is provided with overvoltage protection. One of the output regulators provides improved efficiency through the use of a pair of appropriately connected catch diodes which decrease current change through a filtering inductor, and through implementation of a combined regulator preload resistor and AC pulse width modulating switching transistor drive current source. The converter is a compact modular unit having a low profile with circuit components arranged to minimize temperature instability.

8 Claims, 6 Drawing Figures

HIGH EFFICIENCY DC TO DC CONVERTER

BACKGROUND OF THE INVENTION

This invention relates to DC to DC converters and more specifically to such converters providing multiple regulated output voltages in a portable power source.

Portable test equipment is often used in connection with field work and telephone central office work where operation of the test equipment presents a low voltage requirement from either a 48 or 24 volt battery power source. High efficiency is difficult to obtain in a regulated DC power source at low voltages. Moreover, the delicate nature of the quantities being tested and the test tolerances require that such a low voltage power source contain minimal amounts of output voltage ripple. It is also a frequent requirement that more than one item of test equipment be sustained independently at the same time.

There is, therefore, a requirement for a low voltage, multiple output regulated DC to DC power supply, having a relatively high operating efficiency, low output voltage ripple, and the capability of sustaining independent loads, each placing variable power demand on separate outputs while maintaining output regulation.

SUMMARY AND OBJECTS OF THE INVENTION

In general the high efficiency low output ripple DC to DC converter disclosed herein includes an input section receiving a DC input and providing a substantially constant frequency AC output. A power transformer having primary and secondary windings receives the AC output on the primary winding, and a full wave rectifier is connected across the secondary winding. A filter is coupled to the full wave rectifier to smooth the output thereof. Circuit means is coupled to the output from the full wave rectifier providing a control signal which is synchronized with the AC output. A switching regulator is provided which senses the smoothed DC output level, receives the synchronized control signal, and provides a switching output in response to the sensed DC output level. An electronic switch is actuated by the switching output, which is coupled to the full wave rectifier so that the pulse width of the rectified output coupled to the filter is modulated by alternate actuation and deactuation of the electronic switch. A series diode and preload resistor circuit is connected across the smoothed DC output. The preload resistor is coupled to the electronic switch operating to provide driving current for the electronic switch and to provide preload current to control the transient response of the switching regulator when the switch is deactuated. A pair of catch diodes is connected between the power transformer and a source of electrical current, so that current is provided through the power transformer to the filtering inductor when the AC output goes to zero as well as when the electronic switch is deactuated. The current is provided through one or both of the diodes for either polarity of the AC output, or for zero AC output, so that change in current in the inductor and consequent ripple on the smoothed DC output is reduced.

It is an object of the present invention to provide a DC to DC converter providing a regulated DC output and power on demand to a variable power requirement load while attaining high power supply efficiency.

Another object of the present invention is to provide a DC converter with reduced regulated DC output voltage ripple.

Another object of the present invention is to provide a DC to DC converter which is compact in size, and which has reduced temperature induced supply characteristics variation.

Additional objects and features of the invention will appear from the following description in which the preferred embodiment has been set forth in detail in conjunction with the accompanying drawings.

DESCRIPTION OF THE PREFERRED EMBODIMENT

Figure 1:
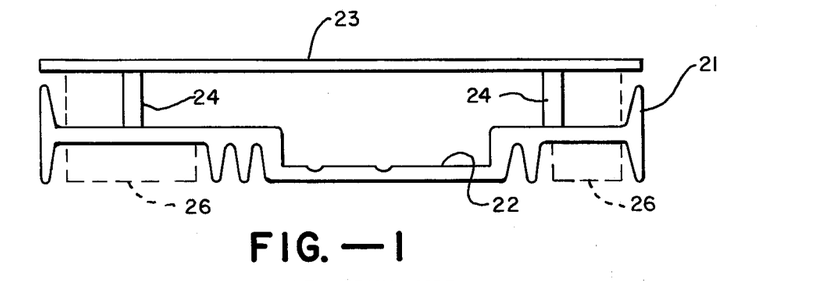
FIG. 1 is an end elevational view showing the physical characteristics of the DC to DC converter.

FIG. 1 of the drawings shows a preferred physical configuration for the disclosed DC to DC converter having a heat sink 21 having a chimney portion 22 formed therein which allows passage of convective air currents operating to collect heat from heat generating circuit components and thereby remove the heat from the immediate area of the heat sink and associated circuitry. A circuit board 23 is spaced from and mounted to heat sink 21 by a number of standoffs 24. The space between circuit board 23 and chimney portion 22 contains a power transformer component to be hereinafter described. Spaces 26 shown in dashed lines on the side of heat sink 21 opposite the side facing circuit board 23, are provided for mounting of power transistors, which operate in conjunction with circuitry carried on circuit board 23, which is to be hereinafter described.

Figure 2:
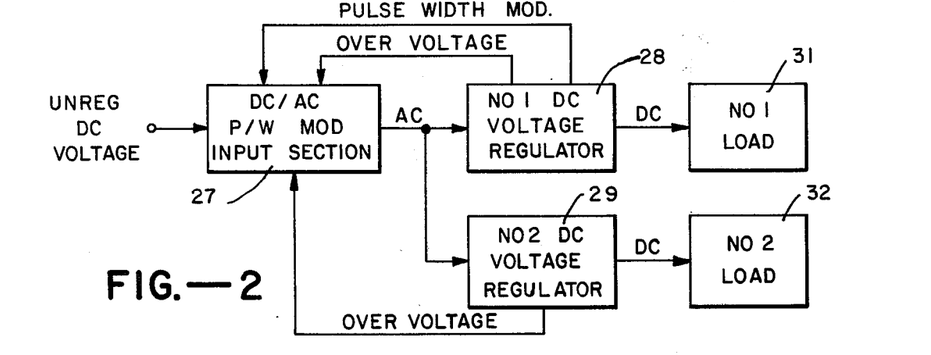
FIG. 2 is a block diagram of the DC to DC converter.

Making reference now to FIG. 2 of the drawings, the basic circuitry of the DC to DC converter consists of three major sections; a DC to AC and pulse width modulation input section 27, a first DC voltage regulator 28, and a second DC voltage regulator 29. Voltage regulator 28 supplies a first load 31 and voltage regulator 29 supplies an independent second load 32. Each of the voltage regulators 28 and 29 are provided with over voltage protection and current limitation through the input section 27. Pulse width modulation for the first voltage regulator 28 is accomplished through a feedback arrangement to the input section 27. Pulse width modulation for power output control at the output of voltage regulator 29 is obtained internally. In this fashion, a constant output voltage is provided at each of voltage regulators 28 and 29, and power is supplied therefrom independently on demand by varying power requirements imposed thereon by the first and second loads 31 and 32.

Figure 3:
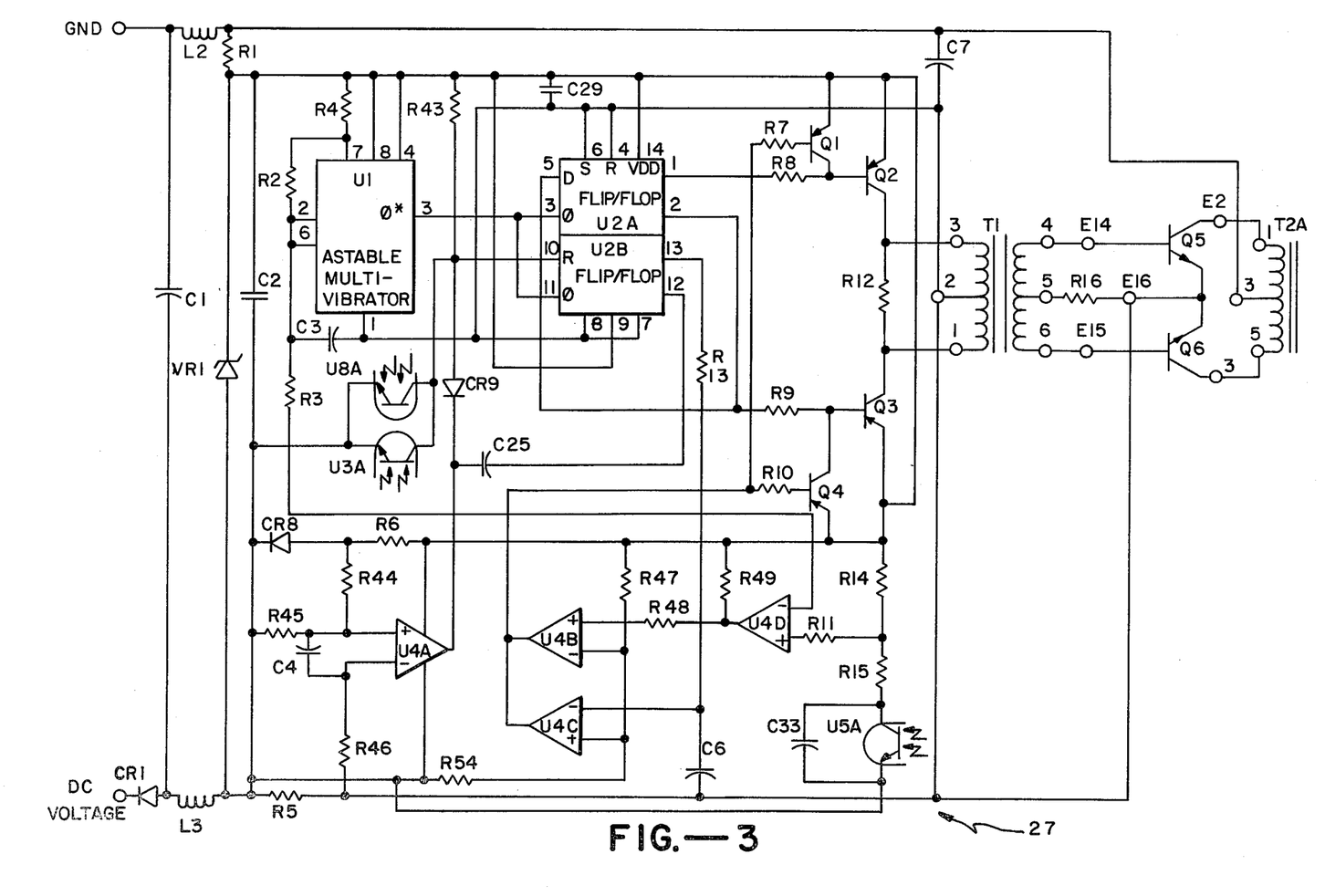
FIG. 3 is an electrical schematic drawing of the input section of the DC to DC converter.

The circuitry for the DC to AC and pulse width modulation input section 27 is shown in the schematic diagram of FIG. 3. An unregulated DC supply such as a 24 or 48 volt main battery is applied to inductors L2 and L3 and capacitors C1 and C7, which form a modified pi filter to reduce input current ripple. A diode CR1 serves as an input polarity protection device. Upon application of the main battery power, resistor R1, Zener diode VR1, and capacitor C2 establish a filtered supply at a voltage level reduced from the battery supply level, which is connected to integrated circuits U1, U2, U4, and transistors Q1 through Q4.

A timing network including resistors R2 and R4 and capacitor C3 is connected to integrated circuit U1, which serves as an astable multi-vibrator. The timing network sets the frequency of astable multi-vibrator U1 at approximately 46 kilohertz in this embodiment. The pulse output of multi-vibrator U1 is applied to the clock inputs of integrated circuit U2A/U2B which serves as a dual flip-flop. Flip-flop U2A divides the 46 kilohertz input by 2, providing a symmetrical 23 kilohertz square wave signal at output terminals 1 and 2 thereon. The output at terminal 2 is the inverse of the output at terminal 1, so that when terminal one output is high terminal 2 output is low.

Upon application of the first clock pulse from multi-vibrator U1 the terminal 2 output at flip-flop U2A goes low, causing a transistor Q3 to be turned on, applying a positive potential to one-half of the primary winding of a transformer T1, between pins 1 and 2 thereon. When the second clock pulse appears at flip-flop U2A, the terminal 2 output goes high and the terminal 1 output goes low causing transistor Q3 to turn off and a transistor Q2 to turn on. The latter action applies a positive potential to the opposite one-half of the primary winding of transformer T1, between terminals 2 and 3 thereon. A resistor R12 is connected across the primary of transformer T1 to provide damping. The resultant alternating current in the primary winding of transformer T1 is coupled into the secondary winding of transformer T1 where the voltage produced alternately switches a pair of power transistors Q5 and Q6 on and off. Base current for transistor Q5 and Q6 is limited by a resistor R16. The alternate switching of transistor Q5 and Q6 generates a square wave voltage, having a peak to peak value approximately twice the main battery voltage. The square wave voltage is seen across the primary winding T2A of a power transformer.

Pulse width modulation in the input section 27 is controlled by a feedback signal which is coupled into the circuit by an opto-isolator U5A. The excitation signal for opto-isolator U5A will be discussed hereinafter. A voltage divider including resistors R14, R15, and U5A supplies a feedback voltage to a non-inverting input of a comparator U4D through a resistor R11. This voltage is compared to a synchronous voltage ramp which is generated by astable multi-vibrator U1 and connected to the inverting input of comparator U4D. The output of comparator U4D is supplied to the non-inverting input of a comparator U4B through an input resistor R48 therefor. A resistor R49 is provided as a pull up resistor for comparator U4D. Another voltage divider including resistors R47 and R54 is provided which establishes a reference voltage connected to the inverting input of comparator U4B. When the output of comparator U4B goes low, transistors Q1 and Q4 are turned on, shunting the base emitter junctions of transistors Q2 and Q3 respectively. Resistors R7, R8, R9 and R10 are provided as base current limiters for transistors Q1 through Q4 respectively.

Assuming transistor Q2 is in the "on" stage as previously described, when the voltage at the non-inverting input of comparator U4D becomes more negative than the synchronizing ramp voltage value at the inverting input of comparator U4D, the output of comparator U4D goes low, causing the output of comparator U4B to go low, thereby turning on transistor Q1 which turns transistor Q2 off. On the next cycle a similar action occurs with transistor Q3 and Q4. This action modulates the pulse width of the square wave in the primary winding T2A of the power transistor, maintaining an RMS power level in the secondary windings of the power transformer which is matched to the output demand at the loads 31 and 32.

Figure 4:
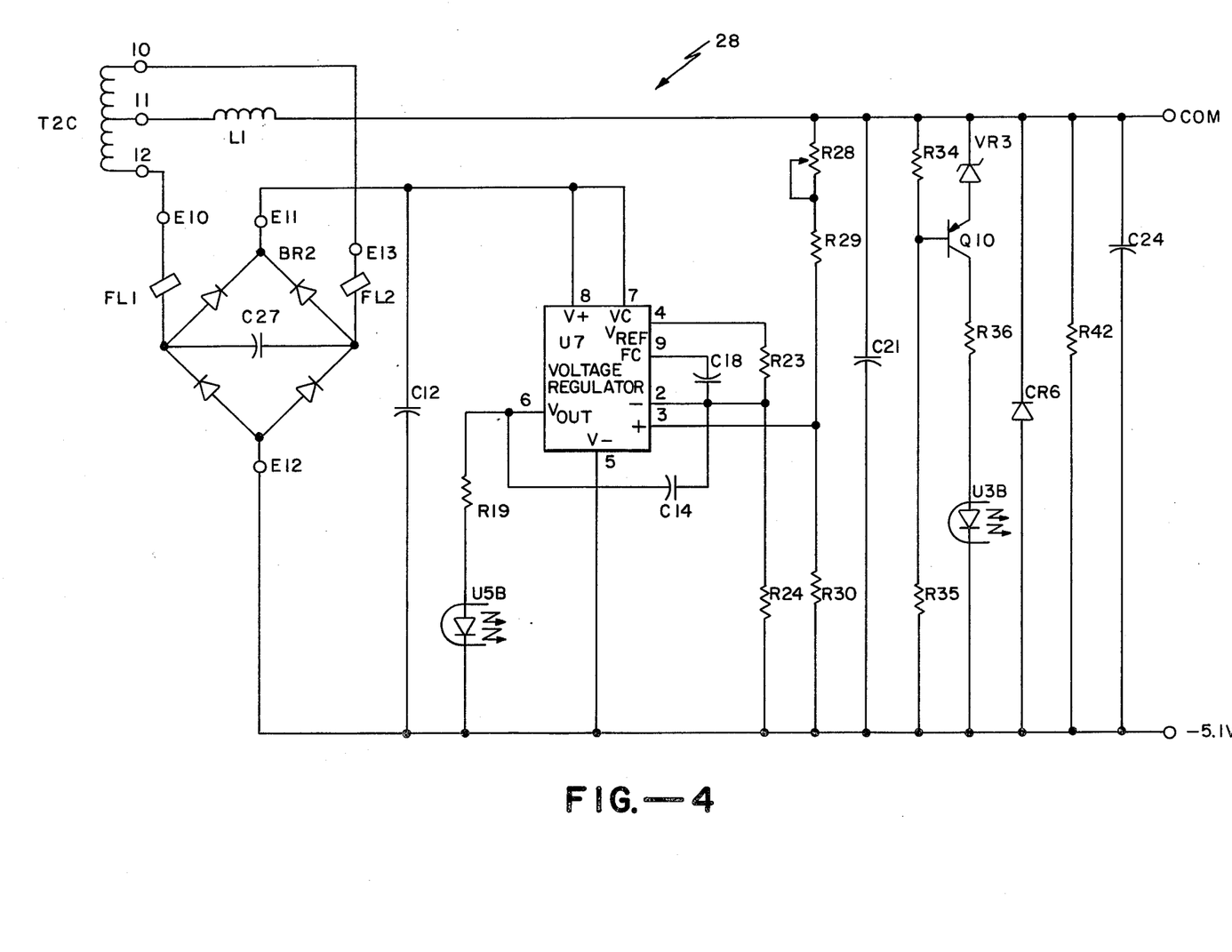
FIG. 4 is an electrical schematic drawing of one output section of the DC to DC converter.

Turning now to FIG. 4 a secondary winding T2C on the power transformer is coupled with the primary winding T2A of FIG. 3. The square wave across secondary winding T2C is rectified by a full wave rectifier BR2. The negative bridge output is filtered by an inductor L1 and a capacitor C21. The positive portion of the bridge output is filtered by a capacitor C12, and provides the positive supply for a voltage regulator U7. The rectified and filtered output is presented as a smoothed DC output at the terminals of FIG. 4 designated common and minus 5.1 volts.

A positive reference voltage is generated internally by voltage regulator U7, and appears across a voltage divider network including resistors R23 and R24. A divided voltage is connected to the inverting input of voltage regulator U7. Capacitors C14 and C18 provide frequency compensation for voltage regulator U7. The smoothed DC output voltage appearing across the output terminals of the circuit of FIG. 4 is applied to another voltage divider including resistors R28, R29, and R30. Resistor R28 is a variable type as shown. A divided voltage is taken from the junction between resistors R29 and R30 and applied to the non-inverting input of voltage regulator U7. The output of voltage regulator U7 supplies a current to opto-isolator U5B through a resistor R19, which provides the feedback signal to opto-isolator U5A described above in connection with the input section circuit of FIG. 3. The feedback signal serves to modulate the pulse width in the primary winding T2A of the power transformer as described above, thereby regulating the minus 5.1 volt output from the first DC voltage regulator 28 of FIG. 4.

Capacitor C24 provides additional output filtering in the circuit of FIG. 4, and capacitor C27 provides "off" control, restricting the voltage swing on secondary winding T2C when power transistors Q5 and Q6 of FIG. 3 are turned off. Diode CR6 of FIG. 4 protects the circuit from external reverse voltages. Resistor R42 provides preload for the circuit for the purpose of controlling transient response. Ferrite beads FL1 and FL2 act as series inductors to control the rate of change of current when power transistors Q6 and Q5 make a transition from one state to another, which thereby allows primary winding T2A of the power transistor to change rapidly, and also reduces the ripple on smoothed DC output between the terminals marked common and minus 5.1 volts in FIG. 4.

Figure 5:
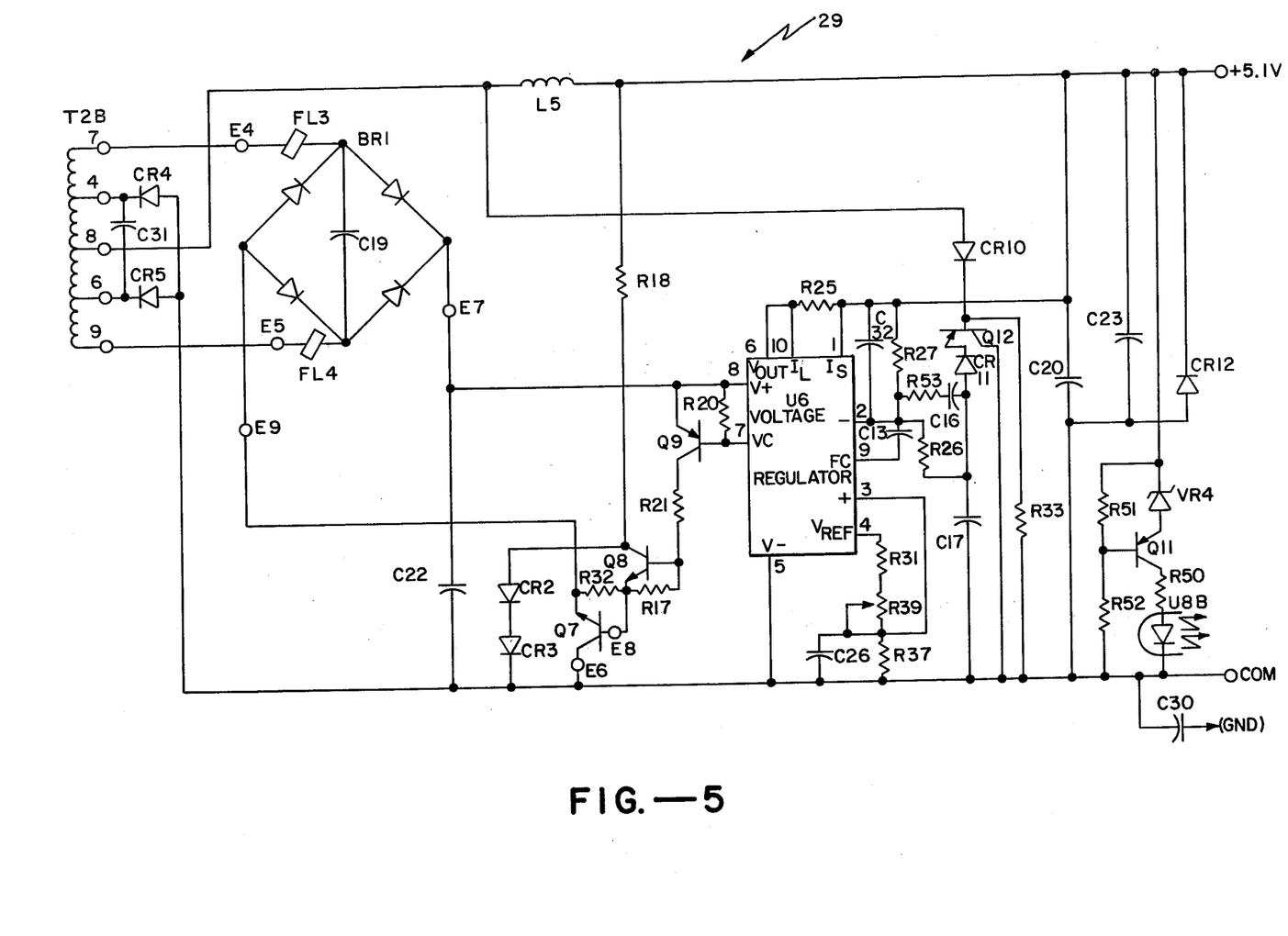
FIG. 5 is an electrical schematic drawing of an independently operating output section of the DC to DC converter.

Turning now to the circuit of FIG. 5 a secondary winding T2B is coupled to primary winding T2A of the power transformer, and produces a peak to peak square wave voltage signal thereacross. The signal at secondary T2B is rectified by a full wave rectifier BR1, is passed through a switching transistor Q7, and is filtered by a capacitor C22. This output of full wave rectifier BR1 is used to bias an integrated circuit regulator U6. Secondary winding T2B also provides power to an inductor L5 and capacitor C20 through full wave rectifier BR1 and the switching transistor Q7, which represent the major switching regulator components in the circuit of FIG. 5. A smoothed DC output voltage is applied to a terminal 2 on a voltage comparator contained in voltage regulator U6 through a resistor R27. Another input to the voltage comparator in voltage regulator U6 is provided at terminal 3 thereon, and is provided from a voltage divider containing resistors R31, R39, and R37 which is excited by the reference voltage generated within voltage regulator U6 at terminal 4. The divided voltage for terminal 3 of U6 is taken from the common junction between resistors R39 and R37. A drop in the smoothed DC output voltage is sensed therefore by the voltage comparator in voltage regulator U6 and causes an output at terminal VC which sinks current from the base of a PNP transistor Q9 causing transistor Q9 as well as a transistor Q8 and switching transistor Q7 to fully conduct and saturate. Conduction through switching transistor Q7 causes the voltage at a centertap on secondary winding T2B to be applied to inductor L5 which in turn charges capacitor C20. This action occurs at a 46 kilohertz rate due to the full wave rectifier action of BR1, when the power transformer containing primary winding T2A and secondary winding T2B is operating at 23 kilohertz. As a consequence, the ripple voltage across capacitor C20 and at the output terminals of FIG. 5 marked common and plus 5.1 volts, is very low.

The drive for switching transistor Q7 is synchronized to the frequency at the power transformer secondary winding T2B to minimize output ripple voltage and to provide stable operation in the second voltage regulator 29. Synchronization is obtained from the secondary winding T2B centertap at pin 8 shown thereon, whereby the wave form at the secondary winding T2B is coupled through diode CR10, transistor Q12, diode CR11, resistor R53, capacitor C16, and resistor R26 to the comparator input at terminal 2 of voltage regulator U6. Capacitor C17, resistor R33 and capacitor C32 aid in shaping the synchronizing wave form for optimum operation.

During those periods when switching transistor Q7 is non-conducting or when the voltage at power transformers secondary winding T2B is zero, a pair of catch diodes CR4 and CR5 provide a path for current to inductor L5, which is of such a level as to reduce current changes in inductor L5. Catch diodes CR4 and CR5 are seen connected to the common side of the smoothed DC output for the circuit of FIG. 5, therefore providing a source for current to be delivered to inductor L5. If only a single catch diode was used connected between one side of the supply and the end of inductor L5 coupled to power transformer secondary winding T2B, that end of inductor L5 would ordinarily go to a substantial negative value at the termination of conductance through switching transistor Q7, as well as at the termination of each half cycle of the square wave produced by secondary winding T2B. Since the inductance L5 is is fixed and the incremental period of time (dt) is fixed, the incremental current (di) is lessened due to the decrease in E obtained through the use of the pair of catch diodes CR4 and CR5 instead of the conventional single diode. It may be seen from the relationship $E = L\, di/dt$, that the variation of the current (di) is less. Also, since $\Delta E = I \Delta T / C$, and C and $\Delta T$ are fixed, the reduction of change in I just described causes a reduced ripple voltage across capacitor C20. The catch diodes CR4 and CR5 are connected to taps 4 and 6 respectively on secondary winding T2B. Efficiency of the second voltage regulator 29 is improved, by the use of the catch diode pair, CR4 and CR5, in conjunction with the transformer taps on secondary winding T2B.

A preload resistor R18 is connected in series with a pair of diodes CR2 and CR3 between the output terminals of the second voltage regulator 29. As a consequence preload resistor R18 serves two functions. Resistor R18 serves to control transient response of voltage regulator U6, and to provide base drive current for switching transistor Q7 through transistor Q8. Since preload is needed for low load currents, and base drive current is needed at switching transistor Q7 for high load currents, this arrangement results in an efficiency improvement of approximately 5%.

Capacitor C19 and C31 together with ferrite beads FL3 and FL4 provide control of voltage and current transients due to reverse recovery times of full wave rectifier BR1, and diodes CR5 and CR4. Ferrite beads FL3 and FL4 operate as inductors in series in the conducting leads they surround. Resistor R25 controls output current level of voltage regulator U6 while capacitor C13 controls the output current rise time at the output voltage regulator U6. Capacitor C23 provides additional filtering at the output terminals marked common and plus 5.1 volts in FIG. 5. A diode CR12 provides protection against external reverse voltages applied at the output terminals of the circuit of FIG. 5. A capacitor C26 filters the reference voltage applied to the reference voltage terminal 3 for the voltage comparator contained within voltage regulator U6.

In the event of overload or shorted output of either of the first or second voltage regulators 28 and 29, a voltage greater than a predetermined value, typically 150 millivolts, will be generated across a load sensing resistor R5 in FIG. 3. The resulting signal is applied to an inverting input of a voltage comparator U4A through a resistor R46. A reference voltage is generated by resistor R6 and diode CR8 and applied to the non-inverting input of voltage comparator U4A through a resistor R44. Resistor R44 together with a resistor R45 form a voltage divider. The reference voltage appearing at the non-inverting input of voltage comparator U4A causes the voltage comparator to be in a normally non-conducting mode. When an overload is sensed by resistor R5, the signal at the inverting input of voltage comparator U4A produces an output therefrom. A capacitor C4 slows the rise time of the turn-on signal at the inverting input of voltage comparator U4A, to allow insensitivity to fast transient overload spikes. When voltage comparator U4A is turned on it causes the reset line of flip-flop U2B terminal 10 to be disabled, allowing the output at flip-flop U2B terminal 13 to go to a high state. The high state at U2B terminal 13 turns voltage comparator U4C on through the time constant of a resistor R13 and capacitor C6. The resulting output from voltage comparator U4C assumes a low state and turns transistors Q1 and Q4 on thereby disabling the drive cycles at transistors Q2 and Q3 by short circuiting the base emitter junctions of the latter two named transistors. Current no longer flows through load sensing resistor R5, thereby allowing voltage comparator U4A to return to its normally off state. The drive cycle at transistors Q2 and Q3 is not initiated, however, until capacitor C25 charges through resistor R43 and diode CR9, to thereby reset flip-flop U2B, and turn the voltage comparator U4C off through resistor R13 and capacitor C6. The load current is therefore again sampled, and the foregoing cycle will repeat until the overload is removed from voltage regulators 28 or 29.

Overvoltage protection of voltage regulator 28 smoothed DC output is provided by the circuit containing resistor R34, R35, and R36, together with Zener diode VR3 transistor Q10 and the opto-isolator U3B seen in FIG. 4. When the Zener threshold diode VR3 is exceeded by 0.7 volts, transistor Q10 conducts causing current to flow through resistor R36 and the light emitting diode shown at U3B. The photo transistor portion of U3A in FIG. 3 is turned on causing the drive cycle to be terminated by disabling the reset input at terminal 10 of flip-flop U2B. Drive cycle sampling is continued as described above for current limiting. Maximum output voltage for overvoltage protection is set at approximately 6 volts for the plus and minus 5.1 volt outputs disclosed herein. The output voltage, however, is sampled at a much faster rate than the sampling provided by the current limiting protection, because capacitor C25 is disconnected from the overvoltage protection circuit by diode CR9.

Overvoltage protection of the second DC voltage regulator 29 is provided by the circuit including resistors R51, R52, and R50, together with Zener diode VR4, transistor Q11, and opto-isolator U8B. As described above in connection with overvoltage protection for first DC voltage regulator 28, when the Zener threshold of Zener diode VR4 is exceeded by approximately 0.7 volts, Q11 conducts, causing current flow through resistor R50 and the light emitting diode of U8B. The photo transistor portion of opto-isolator U8A is seen in FIG. 3, and is turned on causing termination of the drive cycle by disabling the reset input at terminal 10 of flip-flop U2B.

Figure 6:
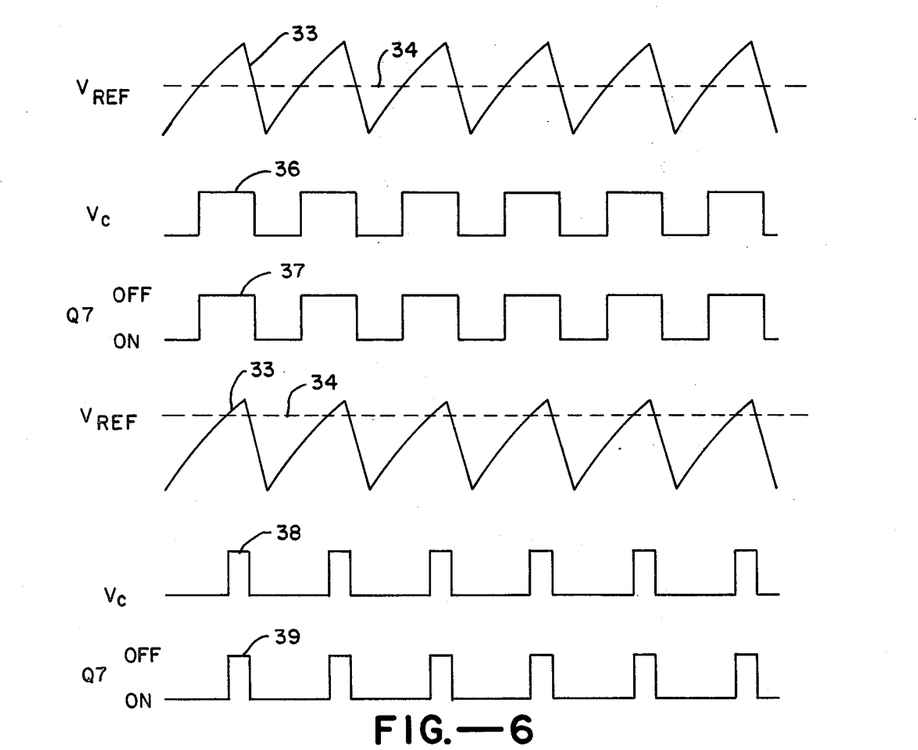
FIG. 6 is a timing diagram showing signals of interest occurring in the electrical circuitry of FIG. 5.

In FIG. 6 a timing diagram is shown relating to signals in the schematic of FIG. 5. A rectified output 33 obtained from full wave rectifier BR1 is shown together with the reference voltage 34 at terminal 4 of voltage regulator U6. The sampled rectified output 33 produces a comparator output 36 at terminal 7 of voltage regulator U6. Voltage comparator output 36 turns on transistor Q9, which in turn causes transistor Q8 and switching transistor Q7 to conduct as seen by the emitter voltage 37 at switching transistor Q7. Switching transistor Q7 may be seen at 37 to be conducting so as to provide an approximate 50% duty cycle. When the voltage on capacitor C20 at the output of second voltage regulator 29 falls below a predetermined value, rectified output 33 begins to decrease relative to reference voltage 34 and the voltage comparator output at terminal 7 of voltage regulator U6 assumes the shape seen at 38 in FIG. 6. As a consequence the emitter voltage at switching transistor Q7 takes the form seen at 39 providing a duty cycle, or on time, which is greater than the 50% duty cycle demonstrated by signal trace 37 above. Consequently, the rectified output from full wave rectifier BR1 is pulse width modulated to bring the smoothed DC output back up to a level determined by the setting made at variable resistor R39 and the reference voltage thereby applied to voltage regulator U6 terminal 4. At that time comparator output up state will assume a narrow pulse width, and transistors Q9 and Q8 together with switching transistor Q7 will be on for a relatively short period of time until the smoothed DC output again begins to decrease toward a lower level.

By way of explanation of operation of the foregoing circuitry, the main battery voltage applied to the input of DC to AC and pulse width modulation input section 27 is filtered and distributed to an astable multi-vibrator controlled power transformer, which supplies an AC square wave voltage input to each of the voltage regulators circuits 28 and 29. The filtered battery voltage is also applied to the input of a Zener regulator VR1 which establishes a reference voltage for the operation of the astable multi-vibrator U1 and for the pulse width modulation section of the circuitry requiring the synchronizing pulse at the inverting input to voltage comparator U4D. Operation of the input section 27 is such that upon activation a 46 kilohertz clock signal, for example, is generated. The clock frequency is halved through the flip-flop U2A, thereby establishing the operating frequency of the input section 27 and synchronization of the astable multi-vibrator U1 with the pulse width modulation function in input section 27. The output of the pulse width modulator contained in input section 27 is then applied to the common bases of the drive transistors Q1 and Q4 in the circuit coupled to the primary winding T2A of the power transformer.

Under no-load conditions at first and second loads 31 and 32, the pulse width modulator in the input section provides a pulse of approximately 15% duty cycle, while under full load conditions the duty cycle is increased to approximately 85%. The result of this action is that the apparent RMS value across primary winding T2A of the power transformer is established by the load demand of its secondary windings T2B and T2C. The secondary load demand information from first voltage regulator 28 is supplied to the pulse width modulator through opto-isolator U5B and U5A, operating as a feedback path from first voltage regulator 28.

AC input provided to the first voltage regulator by secondary winding T2C is converted to DC and applied to an integrated circuit voltage regulator U7 which compares the smoothed DC output voltage from voltage regulator 28 to a reference voltage level generated therein. The results of this comparison are supplied to the pulse width modulator as feedback information, causing the modulator to respond accordingly, as described above, thereby maintaining a constant smoothed DC output voltage at the output terminals shown in FIG. 4.

The AC input supplied through secondary winding T2B to the second voltage regulator 29 is also converted to DC and applied to an integrated circuit voltage regulator U6, which compares the smoothed DC output voltage in FIG. 5 to a reference level at voltage regulator U6 terminal 3. The results of the comparison are supplied to switching transistor Q7 which pulse width modulates the voltage from full wave rectifier BR1 to the filter components inductor L5 and capacitor C20. Power supplied by secondary voltage regulator 29 at constant voltage to secondary load 32 is completely independent of the power supplied at constant voltage by first voltage regulator 28 to first load 31.

Transformer coupling between the secondary windings at T2B and T2C causes the pulse width modulation section including opto-isolator U5A/U5B, and voltage comparators U4D and U4B of FIG. 3 to respond to load demands by first load 31 requiring varying power over a period of time.

A DC to DC converter has been disclosed which provides independent constant voltage outputs providing varying power levels on demand by independent loads, while increasing converter efficiency and decreasing smoothed DC output voltage ripple.

What is claimed is:

1. A dual output, high efficiency, low output ripple DC to DC converter, comprising
    an input section receiving a DC input and providing a substantially constant frequency AC output,
    a transformer having a primary winding receiving said AC output and having first and second secondary windings,
    a first rectifier connected to said first secondary winding and providing a first rectified output,
    a series inductance and parallel capacitance filter receiving said first rectified output and providing a smoothed first DC output,
    smoothing means for sensing said first rectified output and providing a first control signal corresponding thereto,
    a first regulator means for receiving said first rectified output and said first control signal and providing a feedback signal in response to said first control signal when said smoothed first DC output exceeds a predetermined reference level,
    means in said input section receiving said feedback signal and modulating the pulse width of said substantially constant frequency AC output in response thereto, so that said smoothed first DC output is maintained at a substantially constant voltage level while current demand from an applied load varies,
    a second rectifier connected to said second secondary winding providing a second rectified output,
    means for sensing said second rectified output and providing a second control signal which corresponds thereto and which is synchronized with said AC output,
    a series inductance and parallel capacitance filter receiving said second rectified output and providing a smoothed second DC output,
    a second regulator means for receiving said smoothed second DC output and said second control signal and providing a switching output in response thereto,
    an electronic switch connected with said second regulator means and being actuated by said switching output and operating to modulate the pulse width of said second rectified output, so that said smoothed second DC output is maintained at a substantially constant voltage level while current level demand from an applied electrical load varies,
    a series diode preload resistor circuit connected across said smoothed second DC output, said preload resistor circuit being coupled to said electronic switch and operating to provide driving current therefor when said switch is in the on condition and high load current is required at said smoothed second DC output, and to preload said second regulator means when said switch is in the off condition and low load current is required to said smoothed second DC output.

2. A dual output DC to DC converter as in claim 1 wherein the second mentioned series inductance is connected to a centertap on said second secondary winding, together with first and second diodes connected to said second secondary winding on opposite sides of said centertap, and operating to conduct current to said inductance when said electronic switch is off and AC output is zero, whereby change in current level in said inductance is decreased and ripple on said smoothed second DC output is reduced.

3. A high efficiency low output ripple DC to DC converter comprising
    an input section receiving a DC input and providing a substantially constant frequency AC output,
    a power transformer having primary and secondary windings and receiving said AC output on said primary winding,
    a full wave rectifier connected across said secondary winding and providing a full wave rectified output,
    a filter coupled to said full wave rectified output including a series inductor, and providing a smoothed DC output,
    means coupled to said full wave rectified output and providing a control signal synchronized with said AC output,
    a regulator means for sensing the level of said smoothed DC output, receiving said control signal and providing a switching output in response thereto,
    an electronic switch actuated by said switching output and coupled to said full wave rectifier so that the pulse width of said full wave rectified output coupled to said filter is modulated by alternate actuation and deactuation of said electronic switch,
    a series diode and preload resistor circuit connected with said filter so that said smoothed DC output is applied across said circuit, said preload resistor circuit being coupled to said electronic switch, and operating to provide driving current therefor when said switch is actuated, and operating to provide preload current to control transient response of said regulator means when said switch is not actuated.

4. A DC to DC converter as in claim 3 wherein said secondary winding has a centertap, said series inductor being connected thereto,
    and first and second diodes connected between a source of current and said secondary winding on opposite sides of said centertap, whereby current is conducted therethrough to said inductor when said AC output is zero and said electronic switch is deactuated and ripple on said smoothed DC output is reduced.

5. A DC to DC converter as in claim 3 wherein said input section comprises
    an oscillator receiving said DC input and providing a clock frequency,
    means receiving said clock frequency and providing an AC frequency output,
    a pair of switching transistors coupled to said AC frequency output and operating to direct said DC input in alternate directions through said primary winding,
    means for sensing an overload current operating to inhibit said means providing said AC frequency output,
    and means coupled to said smoothed DC output, sensitive to DC output overvoltage, and operating to inhibit said means providing said AC frequency output in response thereto.

6. A DC to DC dual output regulated power supply, comprising
    an input section receiving a DC input and providing a substantially constant frequency AC output,
    an AC to DC converter operating to modulate the pulse width of said constant frequency AC output, and to provide DC power output at a predetermined DC voltage level on demand as determined by a variable power requirement load, a full wave rectifier, a power transformer coupling said AC output to said AC to DC converter, and to the input of said full wave rectifier, a filter including a series inductor and parallel capacitor coupled to the output of said full wave rectifier, whereby a smoothed DC output voltage is obtained, means coupled to the output of said full wave rectifier providing a control signal synchronous with said AC output, a regulator means sensing said smoothed DC output voltage, receiving said control signal, and providing a switching output in response thereto, an electronic switch connected with said regulator means, being actuated by said switching output and being coupled to said full wave rectifier, so as to modulate the pulse width of the output of said full wave rectifier coupled to said filter whereby a substantially constant smoothed DC output voltage is provided for varying power demand imposed by a load connected thereto, a pair of catch diodes connected between said power transformer and a source of electrical current, for passing current through said power transformer to said inductor when said AC output goes to zero and said electronic switch is deactuated, said current being provided for either polarity of the AC output, whereby change in current in said inductor and ripple on said smoothed DC output voltage is reduced.

7. A DC to DC power supply as in claim 6 together with a series diode and preload resistor circuit connected across said smoothed DC output voltage, said preload resistor being connected to provide driving current for said electronic switch when said electronic switch is actuated, and to provide preload current to control transient response when said electronic switch is not actuated.

8. A DC to DC power supply as in claim 6 wherein said power transformer includes primary and secondary windings for coupling said AC output to said AC to DC converter, said secondary winding having a center tap and said catch diodes being connected between said source of current and the secondary winding of said transformer on opposite sides of said center tap.